United States Patent [19]
Ditlinger

[11] 3,893,788
[45] July 8, 1975

[54] FLEXIBLE COUPLING
[75] Inventor: Richard J. Ditlinger, South Bend, Ind.
[73] Assignee: The Bendix Corporation, South Bend, Ind.
[22] Filed: Feb. 6, 1973
[21] Appl. No.: 330,154

[52] U.S. Cl. .................. 416/134; 416/135; 74/579
[51] Int. Cl. ............................................ B64c 27/48
[58] Field of Search ....... 416/134, 143, 135, 134 A; 74/579

[56] References Cited
UNITED STATES PATENTS

| | | | |
|---|---|---|---|
| 1,973,573 | 9/1934 | Lougheed | 416/134 |
| 2,365,357 | 12/1944 | Prewitt | 416/143 |
| 3,362,252 | 1/1968 | Ditlinger | 74/579 |
| 3,578,877 | 5/1971 | Mautz | 416/134 |
| 3,669,566 | 6/1972 | Bourquardez et al. | 416/134 |

FOREIGN PATENTS OR APPLICATIONS

| | | | |
|---|---|---|---|
| 568,951 | 1/1924 | France | 416/135 |
| 1,334,446 | 7/1963 | France | 416/134 |

Primary Examiner—Everette A. Powell, Jr.
Attorney, Agent, or Firm—Gordon H. Chenez; William N. Antonis

[57] ABSTRACT

A flexible tension-torsion coupling particularly adapted to connect a helicopter rotor blade to a rotor hub but useful as a connecting medium between two members wherein similar tension and torsion force loads may be encountered. A plurality of flexible tie bars or belts each preferably of filament wound matrix bound form are arranged in circumferentially spaced apart relationship around and parallel to a pitch change axis passing longitudinally through the rotor blade with one end of each tie bar secured to the rotor hub and the opposite end of each tie bar secured to the rotor blade. All forces including cyclic torsion generated forces are absorbed by the plurality of flexible tie bars which are loaded in tension during rotor rotation. A modified form of the tension-torsion coupling has the plurality of flexible tie bars arranged in circumferentially spaced apart relationship around the pitch change axis with half the plurality of the tie bars angularly disposed to the pitch change axis and the other half of the tie bars oppositely angularly disposed to the pitch change axis.

11 Claims, 11 Drawing Figures

3,893,788

FLEXIBLE COUPLING

BACKGROUND OF THE INVENTION

Various forms of flexible couplings for joining two members such as a helicopter rotor hub and rotor blade and subjected to tension and torsion forces have been proposed as evident from U.S. Pat. Nos. 3,520,637 issued July 14, 1970 and 3,330,362 issued July 11, 1967. Such prior art flexible couplings of which I am aware are not entirely satisfactory for one or more reasons including a requirement for load carrying anti-friction bearings resulting in structural complexity and attendant maintenance problems including lubrication requirements, excess weight and/or size, temperature sensitivity in the relatively large range of temperatures to which an aircraft is exposed, manufacturing expense and subsequent maintenance cost and design limitations which limit flexibility of use on helicopters exhibiting widely different operating characteristics.

It is an object of the present invention to provide a simple and reliable flexible coupling for connecting a helicopter rotor hub and rotor blade.

It is another object of the present invention to provide a flexible tension-torsion coupling for connecting two members and adapted to absorb tension and torsion forces created by one of said two members.

It is an important object of the present invention to provide a flexible tension-torsion tie bar for connecting two members one of which is movable relative to the other.

Other objects and advantages of the present invention will be apparent from the following description and drawings.

DESCRIPTION OF THE PREFERRED EMBODIMENTS

Figure 1:
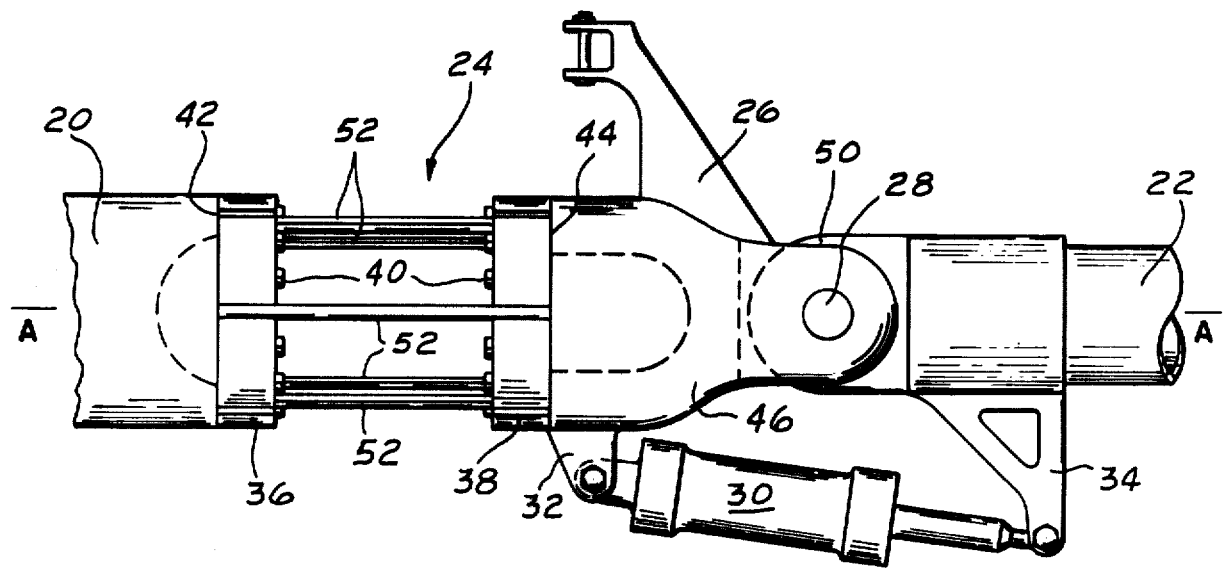
FIG. 1 is a schematic representation of portions of a helicopter rotor hub and rotor blade and flexible coupling therefor embodying the present invention.
Figure 2:
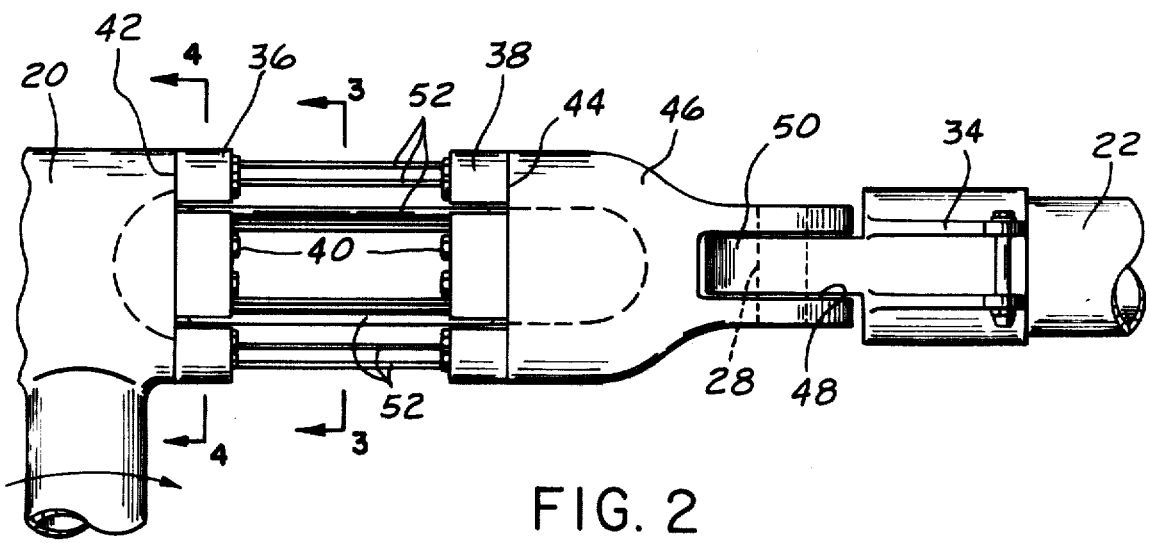
FIG. 2 is a side view of the structure shown in FIG. 1.
Figure 3:
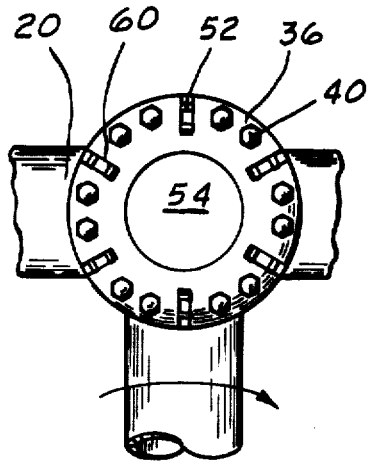
FIG. 3 is a section view taken on line 3—3 of FIG. 1.
Figure 4:
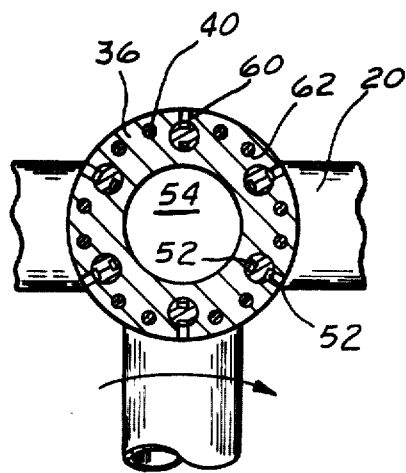
FIG. 4 is a section view taken on line 4—4 of FIG. 1.
Figure 5:
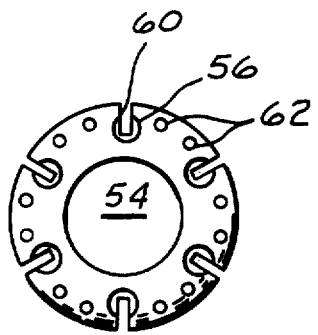
FIG. 5 is a plan view of one of the retaining plates shown removed from the remaining structure of FIG. 1.
Figure 6:
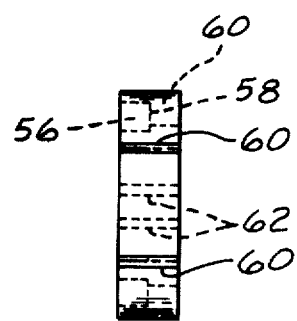
FIG. 6 is a side view of the retaining plate of FIG. 5.
Figure 7:
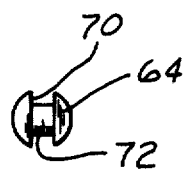
FIGS. 7 and 8 are top and side views, respectively, of one of the retaining fittings shown removed from the retaining plate of FIG. 5.

Referring to the drawings and FIGS. 1 and 2, in particular, numeral 20 designates a portion of a conventional helicopter rotor hub which is rotated by the helicopter engine, not shown. A plurality of spaced apart rotor blades 22 only one of which is shown is connected to the rotor hub 20 by the coupling generally indicated by 24 which includes the present invention. The blade 22 is provided with a pitch arm or bracket 26 fixedly secured to coupling 24 and suitably connected to conventional blade pitch control apparatus, not shown, which positions blade 22 rotationally about its longitudinal axis A—A to thereby establish a desired blade pitch angle by means of which the aerodynamic lift characteristic thereof is established. The blade 22 is pivotally secured to coupling 24 by a hinge pin or shaft 28 to compensate for characteristic lead-lag movement of the blade 22 in the plane of rotation thereof. A conventional hydraulic damper generally indicated by 30 is suitably connected to the coupling 24 and blade 22 by means of brackets 32 and 34, respectively, fixedly secured to coupling 24 and blade 22 and pivotally secured to the damper 30. The damper serves to dampen lead-lag oscillations of the blade about hinge pin 28 as will be recognized by those persons skilled in the art.

The coupling 24 includes two annular retaining members 36 and 38 each of which is provided with a plurality of circumferentially spaced apart bolts 40 extending therethrough into threaded engagement with an annular section 42 of rotor hub 20 or annular section 44 of a base member 46. It will be noted that base member 46 is slotted as at 48 at its opposite end to receive a mating end 50 of blade 22. The slotted portion 48 and mating end 50 are suitably drilled to receive hinge pin 28 thereby pivotally securing blade 22 to base member 46.

As will be described hereinafter in greater detail, a plurality of tie bars or belts 52 arranged radially outwardly from pitch change axis A—A in circumferentially spaced apart relationship are removably secured at one end to annular retaining member 36 and at the opposite end to annular retaining member 38 thereby providing a torsionally flexible coupling capable of supporting blade 22 radially outwardly from and in spaced apart relationship to rotor hub 20.

The tie bars or belts 52 are preferably made in filament wound matrix bound form wherein a plurality of relatively small diameter wires are wound in parallel spaced apart formation and encased by a suitable matrix such as a conventional elastomeric to hold the wires in spaced apart relationship. Reference is made to U.S. Pat. No. 3,265,554 and U.S. Pat. No. 3,228,481 for examples of tie bars or belts having the above mentioned characteristics.

Referring to FIGS. 5, 6, 7 and 8, in particular, the annular retaining member 36 which is identical to retaining member 38 is shown removed from rotor hub 20 and defined by a circular plate 53 having a central opening 54. A plurality of circumferentially equally spaced apart circular openings 56 are formed in one face of circular plate 53 and extend axially therefrom approximately half way through plate 53. Each circular opening 56 terminates in an end wall 58. A radially extending slot 60 extends inwardly from the periphery of plate 53 and partially through end wall 58 along the diameter thereof. The slot 60 terminates short of the radially inward edge of wall 58. A pair of circumferentially spaced apart bolt holes 62 are interposed between adjacent openings 56 to accommodate bolts 40.

Figure 8:
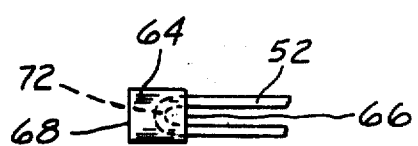

Each circular opening 56 is adapted to slidably receive a cylindrical fitting 64 having opposite end walls 66 and 68 which bear against end wall 58 and annular section 42 of rotor hub 20, respectively. The fitting 64 is provided with a curved recess 70 of the same width as slot 60 and aligned therewith when fitting 64 is in position in opening 56. The recess 70 defines a curved bearing surface 72 which one end of a tie bar or belt 52 is adapted to bear against as shown in FIG. 8.

The coupling 24 is assembled by inserting the tie bars 52 in their respective slots 60 in circular plate 53 and a fitting 64 forced between the opposite sides of each tie bar 52. Each tie bar 52 is pulled axially through its associated opening 56 to draw attached fitting 64 into opening 56 with end wall 66 engaging end wall 58. The retaining member 36 with six tie bars 52 attached thereto in the above-mentioned manner is positioned against annular section 42 of rotor hub 20 and bolts 40 inserted through bolt holes 62 into threaded engagement with rotor hub 20. The bolts 40 are suitably tightened to secure retaining member 36 against rotor hub 20 thereby drawing end walls 66 and 68 of fitting 64 into engagement with end wall 58 and annular section 42, respectively, and trapping fittings 64 with tie bars 52 bearing thereagainst in position in openings 56.

The opposite ends of tie bars 52 are likewise inserted through slots 60 of retaining member 38 and fittings 64 positioned thereon. The retaining member 38 is urged axially to draw fittings 64 into position in openings 56 of retaining member 38. Bolts 40 are inserted through bolt holes 62 of retaining member 38 into threaded engagement with base member 46 thereby securing fittings 64 of retaining member 38 in position against base member 46.

The relatively rigid longitudinal tie bars 52 thus support the base member 38 and blade 22 attached thereto radially outwardly from the rotor hub 20. During rotation of the rotor hub 20 and attached blades 22, the plurality of tie bars 52 connected thereto are exposed to the centrifugal force generated by blades 22 which places the tie bars in a tension mode. Movement of pitch arm 26 causes rotation of blade 22 connected thereto about its longitudinal axis A—A thereby causing a corresponding twisting motion of the tie bars 52 about longitudinal axis A-A. Since the twisting motion imposed on the tie bars 52 is absorbed by the unsupported span thereof between retaining members 36 and 38 it will be recognized that no relative motion between the retaining members 36 and 38 and ends of tie bars 52 bearing thereagainst exists thereby avoiding maintenance problems associated with relative motion of interfaces. Motion occurs integrally in tie bar 52 resulting in evenly distributed stress in the filaments thereof and evenly distributed shear type deflections between filaments with the resulting shear distortion being absorbed by the elastomeric matrix which maintains the filaments in spaced apart relationship.

The principal force exerted on tie bars 52 is centrifugal force generated by rotor blades 22 which places the tie bars 52 in a tension mode. Compression loading of the tie bars 52 does not exist during rotation of rotor hub 20 since any compression force generated by pitch change and/or lead-lag motion of the blades 22 merely serves to reduce the tension load imposed on the tie bars 52. Shear forces imposed on the tie bars 52 as a result of pitch change motion of the blades 22 are relatively low and well within the capability of the tie bars 52 to resist.

Figure 9:
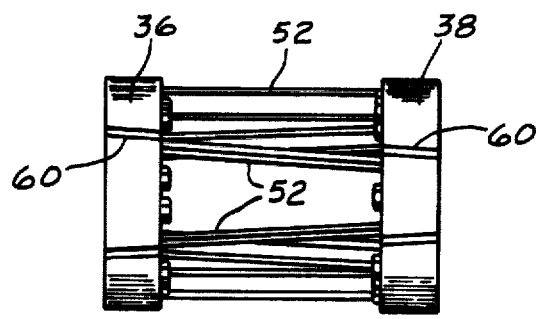
FIG. 9 is a schematic representation of a second embodiment of the present invention.
Figure 10:
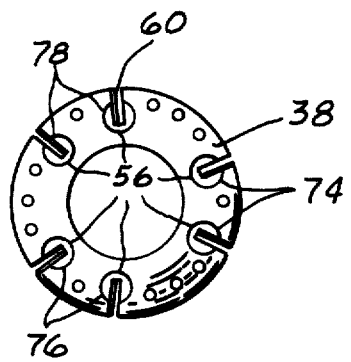
FIG. 10 is a plan view of one of the retaining members of FIG. 9.
Figure 11:
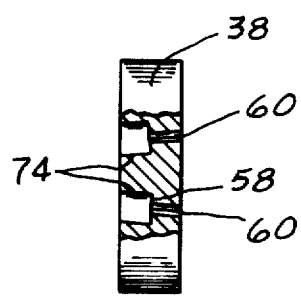
FIG. 11 is a side view of the retaining member of FIG. 10 with a portion thereof broken away to one pair of angled openings and slots therein.

Referring to FIGS. 9, 10 and 11, a modified form of the present invention is shown. The torsional stiffness of the parallel tie bars or belts 52 of FIG. 1 may be reduced by varying the circumferential spacing of openings 56 in one of the annular retaining members 36 and 38. To that end, plate 53 of retaining member 38 may be provided with openings 56 which are arranged in pairs 74, 76 and 78 in predetermined spaced apart relationship wherein the spacing between openings 56 of each pair 74, 76, and 78 is less than the spacing of the openings 56 in retaining member 38 such that the associated pair of tie bars or belts 52 connected therebetween are caused to diverge at a predetermined angle from retaining member 38 to retaining member 36. The resulting effect is to cause a "windup" of three tie bars 52 and "unwind" of the remaining three tie bars 52 in response to rotation of retaining member 38 relative to retaining member 36 thereby reducing the combined torsional resistance of the six tie bars 52 of FIG. 9 relative to that of FIG. 1.

The openings 56 as well as slots 60 associated therewith are angularly disposed in retaining members 36 and 38 to place the same in alignment with the longitudinal axis of the respective tie bar 52 extending therebetween thereby avoiding bending or cocking of the end portions of the tie bars 52. Referring to FIG. 11, it will be noted that the end wall 58 of each opening 56 preferably is made perpendicular to the wall of opening 56.

The cylindrical fitting 64 received by opening 56 is provided with an end portion suitably angled to coincide with the surface plane of associated retaining members 36 or 38.

Various changes and modifications to the above described structure may be made without departing from the scope of Applicant's invention. For example, the fittings 64 and openings 56 are shown in preferred form as being circular. However, it will be recognized that the fittings 64 and openings 56 may take various other forms with no undesirable effect on the operation of the coupling 24.

I claim:

1. A flexible tension-torsion coupling for joining a first member and a relatively movable second member having a longitudinal axis, said coupling comprising:
   a plurality of torsionally flexible endless belts each having parallel side portions and opposite end portions connecting the same;
   said plurality of endless belts being arranged in circumferentially spaced apart formation around said longitudinal axis;
   first retaining means operatively connecting one of said end portions of each of said belts to said first member;
   second retaining means operatively connecting the other of said end portions of each of said belts to said movable second member;
   said plurality of endless belts being operative to maintain said second member in fixed spaced apart relationship to said first member and torsionally responsive to rotational movement of said second member about said longitudinal axis.

2. A flexible tension-torsion coupling as claimed in claim 1 wherein:
   said plurality of torsionally flexible endless belts are each formed of a plurality of parallel filaments arranged in spaced apart relationship and encased in an elastomeric material.

3. A flexible tension-torsion coupling as claimed in claim 1 wherein:
   said first and second retaining means each include a plate member provided with a plurality of spaced apart recesses adapted to receive a fitting providing a bearing surface for one of said opposite end portions; and fastening means removably securing said first and second retaining means to said first and second members.

4. A flexible tension-torsion coupling as claimed in claim 3 wherein:

said plate member is annular and said plurality of spaced apart recesses therein are circumferentially spaced apart circular openings formed in one of the faces of said plate member and provided with an end wall against which said fitting bears.

5. A flexible tension-torsion coupling as claimed in claim 4 and further including:

a slot extending radially inwardly from the outer periphery of said annular plate member and through a major portion of said end wall for receiving an associated endless belt;

said fittings being cylindrical and slidably received by said circular openings and provided with a curved recess adapted to receive one of said opposite end portions of said belts.

6. A flexible tension-torsion coupling as claimed in claim 5 wherein:

said cylindrical fittings are each provided with opposite end walls engageable with said end wall of an associated opening and said first member, respectively.

7. A flexible tension-torsion coupling as claimed in claim 1 and particularly adapted to join a helicopter rotor hub to a variable pitch rotor blade wherein:

said plurality of torsionally flexible endless belts support said rotor blade radially outwardly from said rotor hub in spaced apart relationship and permit rotational movement of said blade about said longitudinal axis in response to pitch change movement of said blade.

8. A flexible tension-torsion coupling as claimed in claim 1 wherein:

said plurality of endless belts are arranged parallel to said longitudinal axis.

9. A flexible tension-torsion coupling as claimed in claim 1 wherein:

said plurality of endless belts are angularly disposed relative to said longitudinal axis.

10. A flexible tension-torsion coupling as claimed in claim 3 wherein:

said spaced apart recesses in said first retaining means are circumferentially equally spaced apart;

said spaced apart recesses in said second retaining means are arranged in circumferentially equally spaced apart pairs wherein the spacing thereof is greater than the spacing of said spaced apart recesses in said first retaining means such that adjacent endless belts connecting said first and second retaining means are caused to diverge.

11. A flexible tension-torsion coupling as claimed in claim 10 wherein:

said recesses are circular and angularly disposed in said first and second retaining means to be aligned longitudinally with an associated endless belt.

* * * * *